(12) United States Patent
Yamada et al.

(10) Patent No.: US 9,303,180 B2
(45) Date of Patent: Apr. 5, 2016

(54) LOW-TEMPERATURE CUREABLE COATING COMPOSITION AND ARTICLE HAVING CURED COATING THEREOF

(71) Applicant: Shin-Etsu Chemical Co., Ltd., Tokyo (JP)

(72) Inventors: Tetsuro Yamada, Annaka (JP); Yuji Yoshikawa, Annaka (JP); Kazuhiro Tsuchida, Annaka (JP); Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 61 days.

(21) Appl. No.: 14/257,043

(22) Filed: Apr. 21, 2014

(65) Prior Publication Data

US 2014/0336329 A1    Nov. 13, 2014

(30) Foreign Application Priority Data

May 9, 2013    (JP) .................................. 2013-099052

(51) Int. Cl.

| | | |
|---|---|---|
| *C08F 30/08* | (2006.01) | |
| *C09D 133/14* | (2006.01) | |
| *C08F 220/12* | (2006.01) | |
| *C09D 143/04* | (2006.01) | |
| *C08F 230/08* | (2006.01) | |

(52) U.S. Cl.
CPC ............ *C09D 133/14* (2013.01); *C08F 220/12* (2013.01); *C09D 143/04* (2013.01); *C08F 30/08* (2013.01); *C08F 230/08* (2013.01); *C08L 2312/08* (2013.01)

(58) Field of Classification Search
None
See application file for complete search history.

(56) References Cited

U.S. PATENT DOCUMENTS

| 3,453,230 | A  * | 7/1969 | Plueddemann ............... 524/858 |
|---|---|---|---|
| 2004/0176518 | A1 * | 9/2004 | Okamoto et al. ............. 524/442 |
| 2007/0167559 | A1 * | 7/2007 | Masatomi et al. ............ 524/556 |
| 2015/0307668 | A1 * | 10/2015 | Kalgutkar et al. ......... C08J 5/00 |

FOREIGN PATENT DOCUMENTS

| EP | 1 403 352 A1 | 3/2004 |
|---|---|---|
| EP | 1 642 946 A1 | 4/2006 |
| JP | 57-36109 A | 2/1982 |
| JP | 58-15566 A | 1/1983 |
| WO | WO 2009/151088 A1 | 12/2009 |

OTHER PUBLICATIONS

Extended European Search Report issued Jul. 29, 2014, in European Patent Application No. 14164990.5.

* cited by examiner

*Primary Examiner* — Robert C Boyle

(74) *Attorney, Agent, or Firm* — Birch, Stewart, Kolasch & Birch, LLP

(57) ABSTRACT

A coating composition comprising a hydrolyzable silyl-containing (meth)acrylic copolymer which is obtained from copolymerization of an alkyl (meth)acrylate with a silane compound having a long-chain alkylene linker between a hydrolyzable functional group and a radically polymerizable unsaturated group, and an organometallic catalyst is low-temperature curable and isocyanate-free. Even though the silane content is increased for coating hardness, the composition maintains alkali resistance and has good adhesion and solvent resistance when applied onto substrates.

11 Claims, No Drawings

LOW-TEMPERATURE CUREABLE COATING COMPOSITION AND ARTICLE HAVING CURED COATING THEREOF

CROSS-REFERENCE TO RELATED APPLICATION

This non-provisional application claims priority under 35 U.S.C. §119(a) on Patent Application No. 2013-099052 filed in Japan on May 9, 2013, the entire contents of which are hereby incorporated by reference.

TECHNICAL FIELD

This invention relates to a low-temperature curable coating composition comprising (A) a hydrolyzable silyl-containing (meth)acrylic copolymer which is obtained from copolymerization of an alkyl (meth)acrylate with a silane compound having a hydrolyzable functional group and a radically polymerizable unsaturated group and (B) an organometallic catalyst. It also relates to an article having a cured coating of the composition.

BACKGROUND ART

From the aspects of energy saving and efficient coating steps, there is a need for coating compositions which are low-temperature curable and highly resistant to chemicals. Among others, compositions comprising a modified acrylic resin and a crosslinker are generally used because of ease of resin production, weather resistance, chemical resistance, and coating strength. Specifically, there are known compositions comprising a hydroxyalkyl-containing acrylic resin and an isocyanate crosslinker and compositions comprising a hydrolyzable silyl-containing acrylic resin wherein the resin is crosslinked via hydrolytic condensation. They are widely used at present.

However, the former has the drawbacks that isocyanate is unstable and difficult to handle, for example, skin irritative. In addition, the isocyanate manufacturing process is quite dangerous because phosgene gas is used. Therefore, the trend is toward the latter approach. For example, JP-A S57-36109 and JP-A S58-15566 propose copolymers of a radically polymerizable monomer and 3-(meth)acryloxypropyltrimethoxysilane. These copolymers have better weather resistance than the acrylic resins of isocyanate crosslinking type. However, most copolymers which are widely used at present contain 3-(meth)acryloxypropyltrimethoxysilane in a molar ratio of less than 5%. Because of fewer siloxane bonds, these copolymers have similar properties to the acrylic resins. Undesirably, coatings of these copolymers tend to have a low hardness and have poor adhesion as demonstrated by a cohesive failure in the adhesion test.

CITATION LIST

Patent Document 1: JP-A S57-36109
Patent Document 1: JP-A S58-15566

DISCLOSURE OF INVENTION

Regarding to the copolymers of a radically polymerizable monomer and 3-(meth)acryloxypropyltrimethoxysilane, the inventors considered that coating hardness and other physical properties would be improved by increasing the content of 3-(meth)acryloxypropyltrimethoxysilane. Although increasing the silane content was effective for suppressing the cohesive failure of coatings, the resultant coatings had weak adhesion and poor solvent resistance. An improvement in hardness was of no significance. Moreover a multiplicity of siloxane bonds brought about a decline of alkali resistance.

An object of the present invention is to provide a low-temperature curable coating composition comprising a hydrolyzable silyl-containing acrylic resin, which maintains alkali resistance and has good adhesion and solvent resistance even when the silane content of the acrylic resin is increased for improving coating hardness.

The inventors have found that when a hydrolyzable silyl-containing (meth)acrylic copolymer which is obtained from copolymerization of an alkyl (meth)acrylate with a silane compound having a hydrolyzable functional group and a radically polymerizable unsaturated group which are linked by a linker of specific carbon chain is combined with an organometallic catalyst, the resulting coating composition is curable at low temperature and that a cured coating of the composition exhibits good alkali resistance, solvent resistance, and adhesion.

In one aspect, the invention provides a low-temperature curable coating composition comprising (A) 100 parts by weight of a hydrolyzable silyl-containing (meth)acrylic copolymer and (B) 0.01 to 10 parts by weight of an organometallic catalyst, wherein the copolymer is obtained from copolymerization of (a1) an alkyl (meth)acrylate and (a2) a silane compound having a hydrolyzable functional group and a radically polymerizable unsaturated group in a molar ratio of (a1/a2) of 98/2 to 2/98, the silane compound (a2) having the general formula (1):

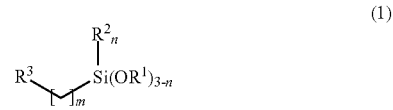

(1)

wherein $R^1$ and $R^2$ are each independently an alkyl of 1 to 3 carbon atoms or aryl, $R^3$ is (meth)acryloxy, vinyl or styryl, m is an integer of 6 to 14, and n is an integer of 0 to 2.

Notably, since the copolymer is prepared by copolymerization of an alkyl (meth)acrylate with a silane compound, it is typically available in solution form. This means that the amount of the copolymer is typically a value calculated as solids of the copolymer solution.

In a preferred embodiment, the molar ratio (a1/a2) of alkyl (meth)acrylate (a1) to silane compound (a2) is 60/40 to 40/60.

Preferably, the silane compound (a2) has the general formula (2):

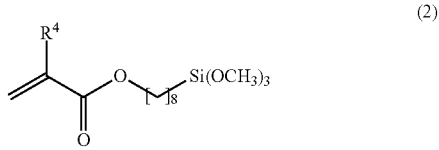

(2)

wherein $R^4$ is hydrogen or methyl.

In a preferred embodiment, the organometallic catalyst (B) contains titanium.

In another aspect, the invention provides an article comprising a substrate and a cured coating of the composition defined above on a surface thereof. Typically, the substrate is an inorganic substrate.

Advantageous Effects of Invention

The coating composition of the invention comprises a hydrolyzable silyl-containing (meth)acrylic copolymer which is obtained from copolymerization of an alkyl (meth)acrylate and a silane compound having a linker of specific carbon chain between a hydrolyzable functional group and a radically polymerizable unsaturated group. In the hydrolyzable silyl-containing (meth)acrylic copolymer, the linker connecting the hydrocarbon main chain to the hydrolyzable functional group on side chain has a long-chain alkylene group as the specific carbon chain, which ensures that even though the silane content is increased for enhancing coating hardness, the composition maintains alkali resistance and has good adhesion, solvent resistance, and low-temperature curability when applied onto substrates.

The composition is curable at low temperature, stable, and isocyanate-free, and thus eliminates the hazard of toxic isocyanate.

DESCRIPTION OF EMBODIMENTS

As used herein, the term "(meth)acrylate" refers collectively to acrylate and methacrylate, and the term "(meth)acrylic copolymer" refers collectively to copolymers of an acrylic monomer, copolymers of a methacrylic monomer, and copolymers of acrylic and methacrylic monomers.

(A) Hydrolyzable Silyl-Containing (Meth)Acrylic Copolymer

A hydrolyzable silyl-containing (meth)acrylic copolymer used in the coating composition of the invention is obtained from copolymerization of (a1) an alkyl (meth)acrylate and (a2) a silane compound having a hydrolyzable functional group and a radically polymerizable unsaturated group.

In the method of preparing the hydrolyzable silyl-containing (meth)acrylic copolymer, the alkyl (meth)acrylate (a1) and the silane compound having a hydrolyzable functional group and a radically polymerizable unsaturated group (a2) may be radically polymerized by any well-known methods such as polymerization in the presence of a radical polymerization initiator and radiation-induced polymerization. The use of a radical polymerization initiator is preferred because of ease of polymerization process.

Typical radical polymerization initiators used herein are azo compounds and organic peroxides which are well known in the art. Suitable initiators include, but are not limited to, azo compounds such as azobisisobutyronitrile (AIBN), 1,1'-azobis(cyclohexanecarbonitrile) (ABCN), and 2,2'-azobis(2-methylbutyronitrile), organic peroxides such as di-tert-butyl peroxide, tert-butyl hydroperoxide (TBHP), and benzoyl peroxide (BPO), and other compounds such as triethylborane and diethylzinc. Of these radical polymerization initiators, the azo compounds are preferred for reactivity, safety and ease of handling. Most preferred is 2,2'-azobis(2-methylbutyronitrile).

The amount of the radical polymerization initiator used is not particularly limited as long as it is sufficient to exert a catalytic effect on radical polymerization reaction. The initiator is preferably used in an amount of 0.0001 to 0.1 mole, more preferably 0.002 to 0.02 mole per mole of starting monomers in total. Less than 0.0001 mole of the initiator may fail to exert the desired catalytic effect. If the initiator exceeds 0.1 mole, the molecular weight may become lower, failing to obtain the desired coating properties, and the catalytic effect may be saturated, suggesting an increased production cost and a loss of economy.

In the method of preparing the hydrolyzable silyl-containing (meth)acrylic copolymer, the radical polymerization may be either solution polymerization or bulk polymerization in the presence of the radical polymerization initiator. In the case of solution polymerization, a reaction solvent is used. The reaction solvent used herein is not particularly limited as long as it is inert to the reactants and does not reduce the activity of a radical polymerization initiator used for the reaction. Examples of the solvent include, but are not limited to, aromatic hydrocarbon solvents such as benzene, toluene, and xylene, aliphatic hydrocarbon solvents such as hexane, heptane, octane, ligroin, and mineral spirits, alcohol solvents such as methanol, ethanol, propanol, isopropanol, butanol, and propylene glycol monomethyl ether, ether solvents such as tetrahydrofuran and dioxane, ester solvents such as methyl acetate, ethyl acetate, propyl acetate, and butyl acetate, and ketone solvents such as acetone, methyl ethyl ketone, and methyl isobutyl ketone. Inter alia, ketone solvents are preferred from the aspects of preparation and handling of the coating composition, and compatibility with the resin. Methyl isobutyl ketone is most preferred.

The solution polymerization process makes it relatively easy to control the molecular weight of the resulting hydrolyzable silyl-containing (meth)acrylic copolymer. The radical polymerization is desirably performed in the presence of a chain transfer agent in order that the resulting reaction solution be converted to a high nonvolatile content coating composition. The chain transfer agent used herein may be selected from mercaptan compounds such as n-dodecyl mercaptan, tert-dodecyl mercaptan, butyl mercaptan, and 3-mercaptopropyltrimethoxysilane, carbon tetrachloride, and carbon tetrabromide.

The reaction temperature is in a range of room temperature (20° C.) to 150° C., preferably 40 to 120° C., and more preferably 60 to 100° C. Below room temperature, the reaction may not take place or the reaction rate may be significantly low, with a loss of productivity. A temperature above 150° C. is undesirable because radicals generated by a radical polymerization initiator can be deactivated, the reactants can volatilize off or be thermally decomposed, or unwanted side reactions can take place.

In the method of preparing the hydrolyzable silyl-containing (meth)acrylic copolymer, the reaction time is typically 10 minutes to 24 hours. While the reaction time is selected such that the reactants may be fully consumed with the progress of reaction, it is preferably 30 minutes to 10 hours, more preferably 1 to 5 hours. If the reaction time is shorter than 10 minutes, the reactants may be consumed insufficiently. If the reaction time exceeds 24 hours, within which the reactants have been completely consumed, an extra time is wasteful, detracting from productivity.

Examples of the alkyl (meth)acrylate (a1) include, but are not limited to, methyl (meth)acrylate, ethyl (meth)acrylate, propyl (meth)acrylate, and butyl (meth)acrylate. Of these, methyl (meth)acrylate is preferred for reactivity and availability of the reactant, with methyl methacrylate being most preferred.

The silane compound having a hydrolyzable functional group and a radically polymerizable unsaturated group (a2) has the general formula (1).

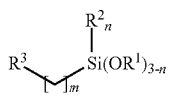

In formula (1), $R^1$ and $R^2$ are each independently an alkyl group of 1 to 3 carbon atoms or aryl group. The alkyl group may be straight, branched or cyclic, and examples include methyl, ethyl, propyl, and isopropyl. Suitable aryl groups include phenyl and naphthyl. Of these, methyl and ethyl are preferred for a balance of ease of reactant preparation, production cost, and hydrolysis, with methyl being most preferred. $R^3$ is a radically polymerizable unsaturated group, examples of which include (meth)acryloxy, vinyl, and styryl. Of these, (meth)acryloxy is preferred for a balance of ease of reactant preparation, production cost, and radical polymerization reactivity, with methacryloxy being most preferred.

In formula (1), m represents the number of carbon atoms in the linker. As long as m is an integer in the range of 6 to 14, the coating composition can exert hardness enhancement effect, alkali resistance, solvent resistance, adhesion, and low-temperature curability when applied onto substrates. Preferably m is an integer of 8 to 12, with m=8 being most preferred from the aspect of ease of reactant preparation. Also, n is an integer of 0, 1 or 2, with n=0 being preferred from the aspect of hydrolysis of hydrolyzable silyl-containing (meth)acrylic copolymer.

Examples of the silane compound having a hydrolyzable functional group and a radically polymerizable unsaturated group (a2) include, but are not limited to,
7-octenyltrimethoxysilane,
7-octenyltriethoxysilane,
7-octenylmethyldimethoxysilane,
7-octenylmethyldiethoxysilane,
4-vinylphenyltrimethoxysilane,
4-vinylphenyltriethoxysilane,
4-vinylphenylmethyldimethoxysilane,
4-vinylphenylmethyldiethoxysilane,
6-(meth)acryloxyhexyltrimethoxysilane,
6-(meth)acryloxyhexyltriethoxysilane,
6-(meth)acryloxyhexylmethyldimethoxysilane,
6-(meth)acryloxyhexylmethyldiethoxysilane,
7-(meth)acryloxyheptyltrimethoxysilane,
7-(meth)acryloxyheptyltriethoxysilane,
7-(meth)acryloxyheptylmethyldimethoxysilane,
7-(meth)acryloxyheptylmethyldiethoxysilane,
8-(meth)acryloxyoctyltrimethoxysilane,
8-(meth)acryloxyoctyltriethoxysilane,
8-(meth)acryloxyoctylmethyldimethoxysilane,
8-(meth)acryloxyoctylmethyldiethoxysilane,
9-(meth)acryloxynonyltrimethoxysilane,
9-(meth)acryloxynonyltriethoxysilane,
9-(meth)acryloxynonylmethyldimethoxysilane,
9-(meth)acryloxynonylmethyldiethoxysilane,
10-(meth)acryloxydecyltrimethoxysilane,
10-(meth)acryloxydecyltriethoxysilane,
10-(meth)acryloxydecylmethyldimethoxysilane,
10-(meth)acryloxydecylmethyldiethoxysilane,
11-(meth)acryloxyundecyltrimethoxysilane,
11-(meth)acryloxyundecyltriethoxysilane,
11-(meth)acryloxyundecylmethyldimethoxysilane,
11-(meth)acryloxyundecylmethyldiethoxysilane,
12-(meth)acryloxydodecyltrimethoxysilane,
12-(meth)acryloxydodecyltriethoxysilane,
12-(meth)acryloxydodecylmethyldimethoxysilane,
12-(meth)acryloxydodecylmethyldiethoxysilane,
13-(meth)acryloxytridecyltrimethoxysilane,
13-(meth)acryloxytridecyltriethoxysilane,
13-(meth)acryloxytridecylmethyldimethoxysilane,
13-(meth)acryloxytridecylmethyldiethoxysilane,
14-(meth)acryloxytetradecyltrimethoxysilane,
14-(meth)acryloxytetradecyltriethoxysilane,
14-(meth)acryloxytetradecylmethyldimethoxysilane, and
14-(meth)acryloxytetradecylmethyldiethoxysilane.

Of these, 8-(meth)acryloxyoctyltrimethoxysilane is preferred for a good balance of ease of reactant preparation, production cost, and radical polymerization reactivity as well as hardness enhancement effect, alkali resistance, solvent resistance, adhesion, and low-temperature curability of the coating composition when applied onto substrates. Most preferred is 8-methacryloxyoctyltrimethoxysilane.

That is, when the silane compound having a hydrolyzable functional group and a radically polymerizable unsaturated group, which is one of monomers to construct the hydrolyzable silyl-containing (meth)acrylic copolymer, has a specific long-chain alkylene group represented by the general formula (2), below, as the linker or structural unit, the resulting coating exerts very good hardness enhancement effect, alkali resistance, solvent resistance, adhesion, and low-temperature curability.

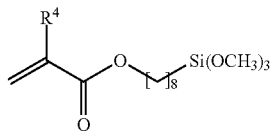

Herein $R^4$ is hydrogen or methyl.

The hydrolyzable silyl-containing (meth)acrylic copolymer is obtained from copolymerization of the alkyl (meth)acrylate (a1) and the silane compound having a hydrolyzable functional group and a radically polymerizable unsaturated group (a2) in a molar ratio (a1/a2) of from 98/2 to 2/98. The molar ratio (a1/a2) is preferably from 80/20 to 20/80, more preferably from 60/40 to 40/60 for a good balance of ease of preparation, production cost, and radical polymerization reactivity as well as hardness enhancement effect, alkali resistance, solvent resistance, adhesion, and low-temperature curability of the coating composition when applied onto substrates. If the content of the silane compound (a2) is less than 2 mol %, the resulting coating may have a low siloxane crosslinking density, indicating substantial losses of hardness, solvent resistance, adhesion, and low-temperature curability. If the content of the silane compound (a2) exceeds 98 mol %, the starting monomer may be consumed insufficiently due to a decline of radical polymerization reactivity and the coating composition may lose storage stability.

Since the hydrolyzable silyl-containing (meth)acrylic copolymer has a hydrolyzable group, it undergoes very slow dealcoholization at room temperature even in the absence of a catalyst and crosslinks to form a cured coating. If a curing accelerant is used, the cure rate becomes faster and the crosslinking density becomes higher, whereby adhesion to the substrate, hardness, alkali resistance, and solvent resistance are improved. Thus, in the practice of the invention, an organometallic catalyst is used as the curing accelerant.

(B) Organometallic Catalyst

The organometallic catalyst used in the coating composition is not particularly limited as long as it is a curing catalyst used in conventional moisture condensation cure compositions.

Examples of the organometallic catalyst include, but are not limited to, titanium base catalysts, for example, tetraalkyl orthotitanates such as tetrabutyl orthotitanate, tetramethyl orthotitanate, tetraethyl orthotitanate, tetrapropyl orthotitanate, and partial hydrolytic condensates thereof, aluminum base catalysts such as aluminum hydroxide, aluminum alcoholate, aluminum acylate, aluminum acylate salts, aluminosiloxy compounds, and aluminum metal chelate compounds, tin base catalysts such as dibutyltin dioctoate, dibutyltin dilaurate, dibutyltin maleate, dioctyltin dioctoate, dioctyltin dilaurate, and tin octoate, and zirconium and bismuth base catalysts. Of these, tetrapropyl orthotitanate and tetrabutyl orthotitanate are preferred for high reactivity.

The organometallic catalyst is added in an amount of 0.01 to 10 parts, more preferably 0.1 to 5 parts by weight per 100 parts by weight of the hydrolyzable silyl-containing (meth) acrylic copolymer, typically calculated as solids of the copolymer solution.

Optionally, fillers and pigments such as various silicas, calcium carbonate, magnesium carbonate, titanium oxide, iron oxide, and fiber glass may be added to the coating composition. When pigments containing an amount of water in the form of adsorption water or crystal water are added, alkoxysilanes such as tetramethoxysilane, tetraethoxysilane, methyltrimethoxysilane, and methyltriethoxysilane and lower alcohols such as methanol, ethanol, isopropyl alcohol, and butyl alcohol may desirably be added as a storage stabilizer. When substantially anhydrous pigments are added, the coating composition can maintain the coating performance sufficient without a need for such storage stabilizer.

The low-temperature curable coating composition is applied onto a surface of a solid substrate and cured, yielding the solid substrate covered with the cured coating of the composition. The solid substrate to be coated is not particularly limited. Most often, the solid substrates used herein are polymer substrates such as polycarbonates, polycarbonate blends, acrylic resins including poly(methyl methacrylate), polyesters including poly(ethylene terephthalate) and poly (butylene terephthalate), polyamides, polyimides, acrylonitrile-styrene copolymers, styrene-acrylonitrile-butadiene copolymers, polyvinyl chloride, polystyrene, polystyrene/polyphenylene ether blends, butyrate, and polyethylene. Also included in the solid substrate are metal substrates, painted surfaces, glass, ceramics, concrete, wood, slates, and textiles. The coating composition is preferably used for the coating of inorganic substrates such as glass, ceramics, concrete, and porous materials, more preferably glass.

When the coating composition is applied on a substrate, it cures at a low temperature, typically within 2 days at 25° C., preferably within 10 hours at 25° C., into a cured coating. As used herein, the term "cured" coating refers to the state of a coating that when the coating surface is rubbed with acetone-impregnated cotton, peeling or wrinkling of the coating as a result of the coating being dissolved is no longer visually observed. The coating exhibits good hardness enhancement effect, solvent resistance, and adhesion because it is crosslinked and cured via siloxane bonds. Since the silane compound, one of the monomers of which the hydrolyzable silyl-containing (meth)acrylic copolymer is made, has a specific long-chain alkylene group as the linker between a hydrolyzable functional group and a radically polymerizable unsaturated group, an article comprising a substrate covered with the cured coating having good alkali resistance and solvent resistance is obtainable.

Therefore, the coating composition and the coating thereof have significantly better properties than prior art well-known air-drying (meth)acrylic resin coatings and are of practical and industrial utility.

EXAMPLE

Examples and Comparative Examples are given below for further illustrating the invention.

Example 1

There were furnished methyl methacrylate as the alkyl (meth)acrylate (a1) and 8-methacryloxyoctyltrimethoxysilane as the silane compound having a hydrolyzable functional group and a radically polymerizable unsaturated group (a2). They were dissolved in a molar ratio a1/a2 of 50/50 in methyl isobutyl ketone to form a monomer mix solution. To the monomer mix solution at 90° C., a methyl isobutyl ketone solution of 2,2'-azobis(2-methylbutyronitrile) was added dropwise. The reaction solution was ripened for 2 hours at 90° C. and then passed through a mesh filter. A corresponding hydrolyzable silyl-containing (meth)acrylic copolymer was obtained as a methyl isobutyl ketone solution having a nonvolatile content of 25%.

Next, 100 parts by weight of the hydrolyzable silyl-containing (meth)acrylic copolymer (corresponding to the solid or nonvolatile content of the copolymer solution) and 5 parts by weight of tetrabutyl orthotitanate as the organometallic catalyst were uniformly mixed and degassed on a mixer, obtaining a coating composition. Using a bar coater No. 14, the composition was applied onto a glass plate in air at 25° C. and humidity 50%. The coating was allowed to dry at room temperature for one week, after which it was evaluated by the following tests.

Example 2

The same procedure as in Example 1 (including mixing ratio and substrate) was repeated except that aluminum di-n-butoxy(ethyl acetoacetate) was used as the organometallic catalyst. The coating was similarly evaluated.

Example 3

The same procedure as in Example 1 (including mixing ratio and substrate) was repeated except that 11-methacryloxyundecyltrimethoxysilane was used as the silane compound (a2). The coating was similarly evaluated.

Example 4

The same procedure as in Example 1 (including mixing ratio and substrate) was repeated except that the alkyl (meth) acrylate (a1) and the silane compound (a2) were combined in a molar ratio a1/a2 of 95/5. The coating was similarly evaluated.

Example 5

The same procedure as in Example 1 (including mixing ratio and substrate) was repeated except that 7-octenyltrimethoxysilane was used as the silane compound (a2). The coating was similarly evaluated.

Comparative Example 1

The same procedure as in Example 1 (including mixing ratio and substrate) was repeated except that 3-methacryloxypropyltrimethoxysilane was used as the silane compound (a2), and the alkyl (meth)acrylate (a1) and the silane compound (a2) were combined in a molar ratio a1/a2 of 95/5. The coating was similarly evaluated.

Comparative Example 2

The same procedure as in Example 1 (including mixing ratio and substrate) was repeated except that 3-methacryloxypropyltrimethoxysilane was used as the silane compound (a2). The coating was similarly evaluated.

Comparative Example 3

The same procedure as in Example 1 (including mixing ratio and substrate) was repeated except that the alkyl (meth)acrylate (a1) and the silane compound (a2) were combined in a molar ratio a1/a2 of 99/1. The coating was similarly evaluated.

The physical properties in Table 1 were measured by the following tests.

Low-Temperature Cure Test

The compositions of Examples 1 to 5 and Comparative Examples 1 to 3 were applied on substrates by the same method as described above and allowed to dry for a certain period. The coating surface was rubbed with acetone-impregnated cotton. The time required until the coating cured to the state that peeling or wrinkling of the coating as a result of the coating being dissolved was no longer visually observed was measured. The test results are shown in Table 1.

Pencil Hardness

The compositions of Examples 1 to 5 and Comparative Examples 1 to 3 were applied on substrates by the same method as described above. After the coating was allowed to dry for one week, the coating was measured for pencil hardness according to the pencil scratch test of JIS K5400 section 6.14. The test results are shown in Table 1.

Cross Cut Adhesion

The compositions of Examples 1 to 5 and Comparative Examples 1 to 3 were applied on substrates by the same method as described above. After the coating was allowed to dry for one week, the coating was measured for adhesion according to the cross cut adhesion test of JIS K5400 section 6.15, specifically by scribing the test piece with a utility knife along 11 longitudinal and 11 transverse lines at a spacing of 2 mm, tightly attaching an adhesive tape strip thereto, pulling back the adhesive tape, and counting the number of coating sections kept unpeeled. The test results are shown in Table 1.

Alkali Resistance

The compositions of Examples 1 to 5 and Comparative Examples 1 to 3 were applied on substrates by the same method as described above. The coating was evaluated for alkali resistance by a spot test using sodium hydroxide solution. Specifically, after the coating was allowed to dry for one week, a droplet of 10% sodium hydroxide aqueous solution was placed on the coating, with a total of 5 droplets at 5 points. The coating was allowed to stand for one hour at room temperature. The droplets were washed away with water and the excess water was wiped off. It was visually observed whether or not the coating was dissolved and water marks were left. In terms of alkali resistance, the coating was rated "good" when no water marks were observed and "poor" when the coating was dissolved. The test results are shown in Table 1.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| Low-temperature cure test | 8 h | 9 h | 6 h | 36 h | 10 h | >48 h | >48 h | >48 h |
| Pencil hardness | H | H | H | F | H | 3B | <6B | <6B |
| Cross cut adhesion | 100/100 | 100/100 | 100/100 | 100/100 | 100/100 | 0/100 | 0/100 | 0/100 |
| Alkali resistance | good | good | good | good | good | good | poor | good |

The test results demonstrate that when the compositions of Examples 1 to 5 are applied on substrates, they cure at a low temperature, that is, cure at 25° C. within 2 days. The coatings have good hardness enhancement effect, solvent resistance, and adhesion because they are crosslinked and cured via siloxane bonds. Since the silane compound of which the hydrolyzable silyl-containing (meth)acrylic copolymer is made has a specific long-chain alkylene group as the linker between a hydrolyzable functional group and a radically polymerizable unsaturated group, an article with a cured coating having good alkali resistance and solvent resistance is obtained.

Modifications may be made to the materials, amounts, ratio, process details, and process procedures in Examples without departing from the scope of the invention. Therefore, the scope of the invention is not to be limited by the foregoing Examples.

Japanese Patent Application No. 2013-099052 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A curable coating composition comprising (A) 100 parts by weight of a hydrolyzable silyl-containing (meth)acrylic copolymer and (B) 0.01 to 10 parts by weight of an organometallic catalyst, wherein said copolymer is obtained from copolymerization of (a1) an alkyl (meth)acrylate and (a2) a silane compound having a hydrolyzable functional group and a radically polymerizable unsaturated group, in a molar ratio (a1:a2)) of 80:20 to 20:80, the silane compound (a2) having the general formula (1):

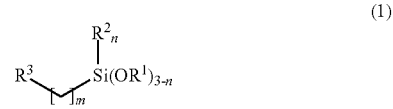

wherein $R^1$ and $R^2$ are each independently an alkyl of 1 to 3 carbon atoms or aryl, $R^3$ is (meth)acryloxy, vinyl or styryl, m is an integer of 8 to 14, and n is an integer of 0 to 2.

2. The composition of claim 1 wherein the molar ratio (a1:a2) of alkyl (meth)acrylate (a1) to silane compound (a2) is 60:40 to 40:60.

3. The composition of claim 1 wherein the silane compound (a2) has the general formula (2):

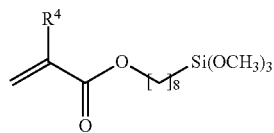

(2)

wherein $R^4$ is hydrogen or methyl.

4. The composition of claim 1 wherein the organometallic catalyst (B) contains titanium.

5. The composition of claim 1, wherein the organometallic catalyst (B) is selected from the group consisting of titanium base catalysts, aluminum base catalysts, tin base catalysts, zirconium base catalysts, and bismuth base catalysts.

6. The composition of claim 4, wherein the organometallic catalyst (B) is a tetraalkyl orthotitanate or a partial hydrolytic condensate thereof.

7. The composition of claim 6, wherein the organometallic catalyst (B) is selected from the group consisting of tetrapropyl orthotitanate and tetrabutyl orthotitanate.

8. An article comprising a substrate and, on a surface thereof, a cured coating of a curable coating composition comprising (A) 100 parts by weight of a hydrolyzable silyl-containing (meth)acrylic copolymer and (B) 0.01 to 10 parts by weight of an organometallic catalyst, wherein said copolymer is obtained from copolymerization of (a1) an alkyl (meth)acrylate and (a2) a silane compound having a hydrolyzable functional group and a radically polymerizable unsaturated group, in a molar ratio (a1:a2) of 80:20 to 20:80, the silane compound (a2) having the general formula (1):

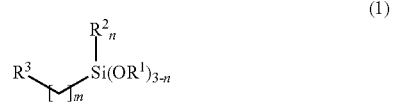

(1)

wherein $R^1$ and $R^2$ are each independently an alkyl of 1 to 3 carbon atoms or aryl, $R^3$ is (meth)acryloxy, vinyl or styryl, m is an integer of 8 to 14, and n is an integer of 0 to 2.

9. The article of claim 8 wherein the substrate is an inorganic substrate.

10. The article of claim 8, wherein the substrate is a polymeric substrate, a metal substrate, a painted surface, glass, a ceramic, concrete, wood, a slate, or a textile.

11. The article of claim 9, wherein curing takes place within 10 hours at 25° C.

\* \* \* \* \*